United States Patent [19]

Niederprum et al.

[11] 3,723,512

[45] Mar. 27, 1973

[54] PERFLUOROALKYL SUBSTITUTED QUATERNARY AMMONIUM SALTS

[75] Inventors: Hans Niederprum, Monheim; Peter Voss; Volker Beyl, both of Leverkusen, all of Germany

[73] Assignee: Farbenfabriken Bayer Aktiengesellschaft, Leverkusen, Germany

[22] Filed: June 9, 1970

[21] Appl. No.: 44,871

[30] Foreign Application Priority Data

June 11, 1969 Germany............P 19 29 665.2

[52] U.S. Cl. ....260/501.15, 260/247.1, 260/294.8 F, 260/309, 260/326.82, 260/999, 260/DIG. 20, 71/121, 8/94.19, 252/2, 252/106, 252/182, 252/357, 23/205

[51] Int. Cl..............................................C07c 87/02

[58] Field of Search .......260/501.15, 448.2 E, 247.1, 260/294.8 F, 309, 326.82; 23/205

[56] References Cited

UNITED STATES PATENTS

| | | | |
|---|---|---|---|
| 3,409,647 | 11/1968 | Pittman et al. | .............260/501.15 X |
| 3,435,039 | 3/1969 | Wakeman et al. | ............260/501.15 X |

*Primary Examiner*—Howard T. Mars
*Assistant Examiner*—Gerald A. Schwartz
*Attorney*—Burgess, Dinklage & Sprung

[57] ABSTRACT

Quaternary ammonium salts of perfluorinated alkylsulfonic acids and their production from a tertiary amine, a perfluorinated alkylsulfonyl fluoride and an alkoxy- or aryloxy-silane which contributes its alkyl or aryl radical to make up the fourth substituent of the resulting quaternary ammonium nitrogen atom.

10 Claims, No Drawings

PERFLUOROALKYL SUBSTITUTED QUATERNARY AMMONIUM SALTS

The present invention relates to hitherto unknown fluorine-containing quaternary ammonium salts of the general formula $$[R^1R^2R^3R^4N]^+ [R_FSO_3]^-$$

wherein $R^1$, $R^2$, $R^3$ and $R^4$, which may be the same or different, are alkyl, alkenyl, cycloalkyl or aralkyl radicals or two or three of $R^1$, $R^2$ and $R^3$ together with the nitrogen may form a heterocyclic ring and $R_F$ represents a perfluorinated straight chain or branched aliphatic radical having from one to 12 C atoms, and a process for their preparation.

The process is characterized in that a perfluorinated sulfonyl fluoride of the formula $R_FSO_2F$ is reacted in the presence of a tertiary amine with a silicic acid ester of the general formula $R_n{}^5Si(OR^4)_{4-n}$ wherein $R^5$ represents an aliphatic or an aromatic hydrocarbon radical, and $R^4$ represents an alkyl, alkenyl, cycloalkyl or aralkyl radical, and $n$ has a value of from 0 to 3. Desirably the reaction is effected in an inert solvent at a temperature of from $-50°$ to $+100°C$. The reaction according to the invention proceeds purely schematically according to the equation $$R_FSO_2F + NR^1R^2R^3 + \rightarrow SiOR^4 \rightarrow [R^1R^2R^3R^4N]^+ [R_FSO^3]^- + \rightarrow SiF.$$

Preferably, $R^1$, $R^2$, $R^3$ and $R^4$ contain up to about 20 carbon atoms and are alkyl radicals and most preferably at least three of them are lower alkyl radicals and the fourth, if not also lower alkyl, may be higher alkyl or a benzyl radical. Preferably $R^5$ is an alkyl radical, and most preferably a lower alkyl radical such as ethyl, or especially methyl. Preferably $R_F$ is a perfluorinated alkyl radical, desirably containing up to about 8 carbon atoms. Preferably $n$ has a value of 0 or 1.

Perfluoroalkyl substituted ammonium salts have already been described. They are versatile in their use, e.g. as a surface active substance for use as a wetting agent and a tenside in emulsions, dispersions, purification, tanning and fire extinguishing agents and as an emulsifying agent in polymerizations. The known compounds, however, contain the perfluoralkyl radical exclusively in the cation whereas the compounds presented here, which possess the same activities as the known compounds, are anion active. Especially the short chain deriVative i.e. the lower alkyl substituted fluorine-containing quaternary ammonium salts are valuable antistatic agents for fabrics, textiles and plastics. The ethyl and methyl derivatives have furthermore biocidal (insecticidal or herbicidal) activities.

Compounds of the following formulas are examples of known ammonium salts:

| | |
|---|---|
| $[C_nF_{2n+1}(CH_2)_mNR_3]^+X^-$ | according to U.S. Pat. No. 3,257,407 |
| $[C_nF_{2n+1}CH_2NR_3]^+X^-$ | according to U.S. Pat. No. 2,727,923 or |
| $[C_nF_{2n+1}SO_2NH(CH_2)_nNR_3{}^+X^-$ | according to U.S. Pat. No. 2,759,019 |

Compared with the perfluoralkyl sulphonates of alkali metals which are already in industrial use, e.g. those of the overall formula $(C_8F_{17}SO_3K)$, the ammonium derivatives prepared according to the invention are distinguished by the ease with which they can be prepared and their wide range of possible uses. This is due to the fact that the solubility of the compounds in different media and their surface active properties can be improved by varying the organic radicals on the nitrogen. Derivatives which, for example, have a long chained paraffin hydrocarbon group such as the stearyl or oleyl group in the cation radical in addition to a perfluorinated alkyl group such as the $C_8F_{17}$ group have particularly interesting properties on account of their synergistic effect.

Preparation of the compounds according to the invention is very simple since the reaction will normally start at room temperature if the three reactants are simply mixed, preferably in an inert polar solvent or a diluent such as an ether or chloroform or acetonitrile. The quaternary ammonium salt precipitates in most cases and can be obtained in a practically analytically pure state by filtration. The Si-F compound formed either escapes as a gas or remains in the filtrate and may be isolated if desired for use in further processes such as conversion into an alkoxysilane. When preparing an alkali metal perfluorosulfonate, on the other hand, the aqueous or alcoholic suspension of a perfluoroalkylsulfonylfluoride generally has to be treated with an alkali metal hydroxide solution and the diluted solution of alkali metal fluoride and alkali metal perfluoralkyl sulphonate has to be concentrated by evaporation. The residue can be isolated by dissolving it e.g. in acetone and concentrating the solution by evaporation.

The perfluoroalkylsulphonyl fluoride required for preparing the ammonium salt according to the invention is readily obtainable by electrochemical fluorination of an alkane sulfonyl halide or of a cyclic sulfone. Examples are $CF_3SO_2F$, $C_2F_5SO_2F$; n-$C_4F_9SO_2F$, $CF_3$-$CF_2$-$CF_2$-$CF(CF_3)$-$SO_2F$, $CF_3$-$CF_2$-$CF(CF_3)$-$CF_2$-$SO_2F$, n-$C_8F_{17}SO_2F$ and n-$C_{10}F_{21}SO_2F$. The alkoxysilanes required for the reaction according to the invention are also generally easily obtainable from siliconchlorine compounds and alcohols. Methoxy and ethoxysilanes having several silicic acid ester groups in the molecule are preferred for reasons of economy. Examples are $(CH_3)_3Si(OCH_3)$, $(CH_3)_2Si(OCH_3)_2$, $(CH_3)Si(OCH_3)_3$, $Si(OCH_3)_4$, $(CH_3)_3Si(OC_2H_5)$ and especially the commercial products $CH_3Si(OC_2H_5)_3$ and $Si(OC_2H_5)_4$.

The amines used may be any tertiary amines including heterocyclic nitrogen bases, e.g. trimethylamine, triethylamine, N,N-dimethyldodecylamine, N,N-dimethylstearylamine, N,N-dimethyloctylamine, diethyldecylamine, diethylstearylamine, dimethylbenzylamine, pyridine, morpholine, 1-methylimidazole, N-methylpyrrolidine and N-methylmorpholine.

The exact mechanism of the reaction which proceeds surprisingly smoothly is unknown but it may be postulated that exchange of the alkoxy groups on the silicon with the fluorine atom of the sulfonyl group takes place in the first stage. The sulfonic ester formed then has an alkylating effect on the tertiary amine, the salt formation being the driving force of the overall reaction since alkoxysilanes do not react with sulfonyl fluorides in the absence of an amine, as some experiments have shown. The reaction according to the invention is therefore remarkable since perfluoroalkylsulfonylfluorides are generally very slow to react and in most cases will react smoothly only with an alkaline reagent, see R.E. Banks and R.N. Haszeldine, in Kharasch and Meyers, The Chemistry of Organic Sulphur compounds, Vol. 2, Chapter 6 (Pergamon Press Oxford 1966). Esters of the formula $R_FSO_2OR$, for example, can only be obtained indirectly (via the silver sulfonate, using an alkyl iodide).

The process will now be described more fully with the aid of the following Examples.

EXAMPLE 1

Tetraethylammonium-perfluorobutylsulfonate 18.2 g (0.06 mol) of perfluorobutylsulfonyl fluoride were dissolved in 50 ml of ether, and 6.6 g (0.061 mol) of triethylamine and 4 g (0.0228 mol) of methyltriethoxysilane were added. The solution which is at first clear became cloudy after 2 hours and a slight increase in temperature occurred. After 24 hours, the precipitated salt was filtered off, washed with ether and dried in a vacuum of 0.4 mm Hg. 18.5 g (approximately 70.5 percent yield) of a white salt of the formula [$(C_2H_5)_4N$]$^+$ [$C_4F_9SO_3$]$^-$, which was confirmed by the $^1H$ and $^{19}F$ nuclear magnetic resonance spectrum, were obtained.

EXAMPLE 2

Tetraethylammonium-perfluorobutylsulfonate 90.6 g (0.3 mol) of perfluorobutylsulfonyl fluoride, 30.6 g (0.303 mol) of triethylamine and 22.2 g (0.15 mol) of dimethyldiethoxysilane were successively dissolved in 350 ml of diethylether. The temperature of the reaction mixture rose to 27°C. Crystallization of the quaternary ammonium salt started after a few hours and was complete within 2 days. The crystals were filtered off, washed with diethylether and finally freed from the adhering solvent in a vacuum of 1 mm Hg. Yield 111.8 g (78.5 percent of theoretical), m.p. 180°–183°C. The product was identified as [$N(C_2H_5)_4$]$^+$ [$C_4F_9SO_3$] by its IR, $^1H$-NMR and $^{19}F$-NMR spectrum.

Analyses: Calculated: 33.6% C; 4.7% H; 3.3% N; 7.5% S; 39.8% F.
Found: 33.0% C; 4.3% H; 3.4% N; 7.5% S; 37.1% F.

EXAMPLE 3

Tetraethylammonium-perfluoromethylbutylsulfonate 35.2 g (0.1 mol) of perfluoromethylbutylsulfonyl fluoride (isomeric mixture of perfluoro-3-methyl-butylsulfonyl fluoride and perfluoro-2-methyl-butylsulfonyl fluoride), 7.4 g (0.05 mol) of dimethyldiethoxysilane and 10.1 g (0.1 mol) of triethylamine were dissolved in 250 ml of diethylether. The quaternary ammonium salt crystallized within 2 days from the solution which became slightly heated during the process. The ammonium salt was filtered off, washed with diethyl ether and dried in a vacuum of 1 mm Hg. Yield: 37.5 g (78.2% of theoretical), m.p. 190° to 196°C. The compound was identified as [$N(C_2H_5)_4$]$^+$ [$SO_3C_5F_{11}$]$^-$ by its IR, $^1H$-NMR and $^{19}F$-NMR spectrum.

Analyses: Calculated: 32.6% C; 4.2% H; 2.9% N; 6.7% S; 43.6% F.
Found: 32.2% C; 4.5% H; 2.9% N; 6.2% S; 41.4% F.

EXAMPLE 4

Trimethyl-dodecyl-ammonium-perfluorobutylsulfonate 12.0 g (0.1 mol) of dimethyldimethoxysilane and 60.4 g (0.2 mol) of perfluorobutylsulfonylfluoride were introduced into 500 ml of acetonitrile, and 42.6 g (0.2 mol) of N,N-di-methyl-dodecylamine were added. The temperature of the reaction mixture rose rapidly to about 50°C. and perfluorobutylsulphonyl fluoride and N,N-dimethyldodecylamine which were initially not dissolved gradually went into solution. The clear solution was concentrated by evaporation and the remaining solid product was treated with diethylether and filtered off. Since the desired quaternary ammonium salt was partly dissolved in diethylether, the filtrate was partly evaporated several times and the product was crystallized out on evaporation was filtered off each time.

The reaction product was freed from diethylether in a vacuum of 1 mm Hg. Yield: 80.0 g (76% of theoretical), m.p. 160°–163°C. The quaternary ammonium salt [$(CH_3)_3NC_{12}H_{25}$]$^+$ [$C_4F_9SO_3$]$^-$ was identified by the IR, $^1H$-NMR and $^{19}F$-NMR spectrum.

EXAMPLE 5

Trimethyl-stearyl-ammonium-perfluorobutylsulfonate 7.6 g (0.05 mol) of tetramethoxysilane and 59.4 g (0.2 mol) of N,N-dimethylstearylamine were dissolved in 400 ml of tetrahydrofuran and the solution was treated with 60.4 g (0.2 mol) of perfluorobutylsulfonyl fluoride. The temperature of the reaction mixture rapidly rose to 50°C. Since the quaternary ammonium salt did not crystallize when the solution was cooled and left to stand for some time, the solvent was completely removed by evaporation and the white residue taken up in diethylether and filtered. The diethyl ether still adhering to the product was evaporated off in a vacuum of 1 mm Hg. Yield: 102.0 g (84 percent of theoretical), m.p. 133°–136°C. Its identity with [$(CH_3)_3NC_8H_{17}$]$^+$ [$C_4F_9SO_3$]$^-$ was confirmed by the IR, $^1H$-NMR and $^{19}F$-NMR spectrum.

EXAMPLE 6

Triethyl-octylammonium-perfluorobutylsulfonate 20.5 g (0.11 mol) of diethyl-n-octylamine and 8.15 g (0.055 mol) of dimethyldiethoxysilane were dissolved in 150 ml of diethyl ether, and 33.1 g (0.11 mol) of perfluorobutylsulfonyl fluoride were added. The reaction manifests itself in a temperature rise of a few degrees C. The desired salt crystallized from the solution within a few days. It was isolated by filtration, washing with diethyl ether and drying in a vacuum of 1 mm Hg. Yield: 46.5 g (82.5% of theoretical); m.p. 152°–155°C. The IR, $^1H$-NMR and $^{19}F$-NMR spectrum of the product agreed with those expected for a quaternary ammonium salt of the formula [$C_2H_5)_3NC_8H_{17}$]$^+$ [$C_4F_9SO_3$]$^-$.

Analyses: Calculated: 42.1% C; 6.2% H; 2.7% N; 6.2% S; 33.3% F.
FOUND: 42.3% C; 6.7% H; 2.8% N; 5.8% S; 34.3% F.

EXAMPLE 7

Tetramethylammonium-trifluoromethylsulfonate

In a 1 liter three-necked flask equipped with dry ice cooler, a stirrer and an inlet tube, a solution of 76 g (0.5 mol) of tetramethoxysilane in 500 ml of ether was condensed with 180 ml (2 mol) of trimethylamine at a temperature of from −30° to −40°C. A total of 439 g (2.9 mol) of gaseous trifluoromethylsulfonyl fluoride was added with stirring and reacted for 48 hours at about −40°C. The reaction mixture was heated to room temperature and the solid product was filtered, washed with about 300 ml of ether and freed from ether adhering to it by heating it in a vacuum. The yield of [N(CH$_3$)$_4$]$^+$ [CF$_3$SO$_3$]$^-$ was 87 g (19.5 percent of theoretical based on Si(OCH$_3$)$_4$). The product was identified by analysis of its elements and IR, $^1$H-NMR and $^{19}$F-NMR spectroscopy. The yield can be substantially increased by carrying out the reaction in a closed system.

EXAMPLE 8

Trimethyl-dodecylammonium-perfluoroctylsulfonate 114.3 g (0.228 mol) of perfluoroctylsulfonylfluoride and 42.0 (0.404 mol) of trimethylmethoxysilane were added to 250 ml of anhydrous ether in a 1 liter three-necked flask which was equipped with a cooler provided with a drying tube, a KPG stirrer and thermometer. After dropwise addition of 86 g (0.404 mol) of dimethyldodecylamine, the contents of the flask became cloudy and yellow. A precipitate having the appearance of ivory colored mother of pearl slowly formed with self heating of the ether to a slight reflux. After the addition of a further 400 ml of ether, the contents of the flask were heated to the reflux temperature of ether for 24 hours. The pale yellow precipitate was filtered from the yellow colored ether, washed twice with 100 ml of ether, again suspended in 300 ml of ether, filtered and freed from residues of ether in a vacuum. The yield of [N(CH$_3$)$_3$C$_{12}$H$_{25}$]$^+$ [C$_8$F$_{17}$SO$_3$]$^-$ was 152 g, corresponding to 91.8 percent based on C$_8$F$_{17}$SO$_{2bi}$$^{F. m.p.}$ 173°C.

Analyses: Calculated: 38.0% C; 4.7% H; 1.9% N; 4.4% S; 44.4% F.

Found: 38.1% C; 4.8% H; 1.8% N; 4.6% S; 46.0% F.

EXAMPLE 9

Trimethyl-stearylammonium-perfluorooctylsulfonate 114.3 g (0.228 mol) of perfluoroctylsulfonylfluoride, 24.0 g (0.20 mol) of dimethyldimethoxysilane and 118.8 g (0.4 mol) of dimethylstearylamine were added successively with stirring to 500 ml of absolute ether in a 1 liter three-necked flask which was equipped in the known manner. A white mother-of-pearl like precipitate separated from the slightly yellow solution in an exothermic reaction. The reaction mixture was then heated under reflux for a further 5 hours. The white precipitate was filtered from the yellow ethereal solution, washed several times with ether and slightly heated in a vacuum. The yield of [N(CH$_3$)$_3$C$_{18}$H$_{37}$]$^+$ [C$_8$F$^{17}$O$_3$]$^-$ was 156 g (84.4 percent of theoretical). M.p. 157°C.

Analyses: Calculated: 42.9% C; 5.7% H; 1.7% N; 3.9% S; 39.8% F.

Found: 43.6% C; 5.7% H; 1.7% N; 3.5% S; 39.9% F.

EXAMPLE 10

Trimethyl-benzylammonium-perfluorobutylsulfonate 121 g (0.395 mol) of perfluorobutylsulfonyl chloride, 24.0 g (0.2 mol) of dimethyldimethoxysilane and 34.0 g (0.252 mol) of dimethylbenzylamine were successively added with stirring to 200 ml of ether. A white precipitate were formed in an exothermic reaction. The contents of the flask were heated under reflux for 20 hours. The resulting reaction product was filtered off, washed several times with ether and freed from diethylether still adhering to it in a vacuum. The yield of [N(CH$_3$)$_3$C$_6$H$_5$CH$_2$]$^+$ [C$_4$F$_9$SO$_3$]$^-$ was 102 g (90.2 percent of theoretical). M.p. 123°–125°C.

Analyses: Calculated: 37.4% C; 3.6% H; 3.3% N; 7.1% S; 38.1% F.

Found: 37.6% C; 3.7% H; 2.9% N; 7.2S; 37.6% F.

EXAMPLE 11

Trimethyl-benzylammonium-perfluorobutylsulfonate

A solution of 302 g (0.1 mol) of perfluorobutylsulfonyl fluoride and 180 g (1.0 mol) of trimethylbenzoxysilane in 900 ml of ether was condensed at 0°C. with 90 ml (1.0 mol) of trimethylamine in a 1 liter three-necked flask equipped with KPG stirrer, a dry ice cooler and a gas inlet tube. A reaction set in immediately with formation of a white precipitate. The reaction product was filtered off, washed three times with 100 ml portions of ether and freed from ether adhering to it in a vacuum. The yield of [N(CH$_3$)$_3$C$_6$H$_5$CH$_2$]+[C$_4$F$_9$SO$_3$]$^-$ was 389 g (88.0 percent of theoretical), m.p. 123.5°–124°C.

EXAMPLE 12

Trimethyl-octylammonium-perfluorooctylsulfonate 100.6 g (0.2 mol) of perfluorooctylsulfonylfluoride, 12.0 g (0.1 mol) of dimethyldimethoxysilane and 35 g (commercial 90 percent, 0.2 mol) of dimethyloctylamine were added successively to 250 ml of ether in a 1 liter three-necked flask. The originally clear, yellow solution became cloudy and a white precipitate then formed in an exothermic reaction. The contents of the flask were then heated under reflux for 6 hours with stirring. The reaction product was filtered off and washed several times with a total of 800 ml of ether and freed from residues of ether in a vacuum. The yield of [N(CH$_3$)$_3$C$_8$H$_{17}$]$^+$ [C$_8$F$_{17}$SO$_3$]$^-$ was 107 g (79.7 percent theoretical), m.p. 165°–169°C.

Analyses: Calculated: 34.0% C; 3.9% H; 2.1% N; 4.8% S, 48.2% F.

Found: 34.9% C; 4.1% H; 2.1% N; 4.7% S; 47.9% F.

EXAMPLE 13

Triethyl-allylammonium-perfluorooctylsulfonate 53.5 g (0.107 mol) of perfluorooctylsulfonylfluoride, 8.0 g (0.0374 mol) of methyltriallyloxysilane and 11 g (0.109 mol) of triethylamine were added successively with stirring to 200 ml of ether in a 500 ml three-necked flask. An exothermic reaction took place, the reaction mixture at first becoming cloudy and then forming a jelly-like precipitate. After 8 hours' heating under reflux, the reaction product which was pale pink was filtered off, washed with 400 ml of ether and freed from the ether adhering to it in a vacuum. The yield of [N(C$_2$H$_5$)$_3$C$_3$H$_5$]$^+$ [C$_8$F$_{17}$SO$_3$]$^-$ was 52.0 g (75.6 percent of theoretical), m.p. 125°– °C.

Analyses: Calculated: 31.8% C; 3.1% H; 2.2% N; 5.0% S; 50.4% F.

Found: 32.0% C; 3.3% H; 2.3% N; 5.0% S; 49.5% F.

EXAMPLE 14

N-methyl-pyridinium-perfluorobutylsulfonate 151 g (0.5 mol) of perfluorobutylsulfonyl fluoride, 30 g (0.025 mol) of dimethyldimethoxysilane, 39.5 g (0.5 mol) of pyridine and 200 ml of acetonitrile as solvent were introduced into a flask and stirred. The perfluorobutylsulfonyl fluoride formed one phase which dissolved completely within 12 hours with a temperature rise of about 5°C. from room temperature. The reaction solution was thereafter completely evaporated. The oily product remaining behind crystallized on cooling and was washed with benzene, filtered and dried in a vacuum of 1 mm Hg. Yield: 166 g (84.4 percent of theoretical). The identity of the product as $[C_5H_{ax}{}^{NCH_3}]^+ [C_4F_9SO_3]^-$ could be confirmed by its IR, $^1$H-NMR and $^{19}$F-NMR spectrum and elementary analysis.

EXAMPLE 15

N,N'-Dimethyl-imidazolium-perfluorobutylsulfonate 41 g (0.5 mol) of 1-methyl-imidazole were added dropwise with stirring to a solution of 155 g (0.5 mol) of perfluorobutylsulfonyl fluoride (97.6 percent pure) and 70 g (0.25 mol) of dimethyldimethoxysilane in 200 ml of ether. The ethereal solution became cloudy and slightly heated and an orange colored liquid phase of high specific gravity was formed. The contents of the flask were heated under reflux for several hours. The liquid reaction product solidified in the process to an orange colored crystalline precipitate. The solid was filtered off, washed with ether and freed from the adhering solvent in a vacuum. The yield of $[C_2H_2N(CH_3)CHN(CH_{3e}{}')]^+ [C_4F_9SO_3]^-$ was 186 g (93.9 percent of theoretical), m.p. 57.5°C.

EXAMPLE 16

N-Dimethyl-pyrrolidinium-perfluorobutylsulfonate 302 g (1.0 mol) of perfluorobutylsulfonylfluoride and 60 g (0.5 mol) of dimethyl-dimethoxysilane were added to 700 ml of ether in a 2 liter three-necked flask. A total of 85 g (1.0 mol) of N-methylpyrrolidine were added dropwise in the course of 4 hours to the clear solution. Quaternization took place immediately in a very strongly exothermic reaction, a white precipitate being formed. The product was filtered, washed with 400 ml of ether and freed from residues of ether in a vacuum. The yield of $[(CH_2)_4N(CH_3)_2]^+ [C_4F_9SO_3]^-$ was 350 g (87.7 percent of theoretical), m.p. 193°C.

EXAMPLE 17

N-Dimethyl-morpholinium-perfluorobutylsulfonate 302 g (1.0 mol) of perfluorobutylsulfonylfluoride and 60 g (0.5 mol) of dimethyl-dimethoxysilane were dissolved in 600 ml of ether in a 1 liter three-necked flask (KPG stirrer, thermometer, dropping funnel and cooler). 101 g (0.1 mol) of N-methylmorpholine were added dropwise to this solution in 10 minutes. The solution became cloudy without appreciable evolution of heat. The contents of the flask were heated under reflux with stirring for one day after which time an orange red precipitate formed. The reaction product was filtered from the yellow ethereal solution, again taken up in about one liter of ether and washed several times with ether. The yield of $[OC_4H_8N(CH_3)_2]^+ [C_4F_9SO_3]^-$ was 366 g (88.2 percent of theoretical), m.p. 138°C.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A process for the preparation of a perfluoroalkyl-substituted quaternary ammonium salt of the formula $$[R^1R^2R^3R^4N]^+ [R_FSO_3]^-$$

wherein a perfluoroalkylsulfonylfluoride of the formula $R_FSO_2F$ in which $R_F$ represents a perfluorinated straight chain or branched aliphatic hydrocarbon radical having from one to 12 C atoms is reacted with a tertiary amine of the formula $R^1R^2R^3N$ in the presence of a silicic acid ester of the formula $R_n{}^5$ Si $(OR^4)_{4-n}$ in which $R^1$, $R^2$, $R^3$ and $R^4$, which may be the same or different, are alkyl, alkenyl, cycloalkyl or aralkyl radicals having up to 20 C atoms, or two or three of $R^1$, $R^2$ and $R^3$ together with the nitrogen atom may form a heterocyclic ring selected from the group consisting of pyridine, imidazole, pyrrolidine and morpholine rings, $R^5$ represents an aliphatic or aromatic hydrocarbon radical, and $n$ has a value from 0 to 3 wherein the reaction is carried out at a temperature of from −50° to 100°C.

2. A process according to claim 1, wherein three of $R^1$, $R^2$, $R^3$ and $R^4$ are lower alkyl.

3. A process according to claim 2, wherein the fourth of $R^1$, $R^2$, $R^3$, and $R^4$ is higher alkyl or benzyl.

4. A process according to claim 1, wherein $R_F$ is a perfluorinated alkyl radical containing up to about eight carbon atoms.

5. A process according to claim 4, wherein $R^5$ is a lower alkyl radical and $n$ is 1.

6. A process according to claim 1, wherein the reaction is carried out in an inert solvent at a temperature of from −50° to +100°C.

7. A compound of the general formula:

$$]R^1R^2R^3R^4N]^+ [R_FSO_3]^-$$

in which $R_F$ represents a straight chain or branched perfluorinated aliphatic hydrocarbon radical having from one to 12 C atoms and $R^1$, $R^2$, $R^3$ and $R^4$, which may be the same or different, are alkyl, alkenyl, cycloalkyl or aralkyl radicals having up to 20 C atoms or two or three of $R^1$, $R^2$ and $R^3$ form a heterocyclic ring together with the nitrogen selected from the group consisting of pyridine, imidazole, pyrrolidine and morpholine rings.

8. A compound according to claim 7, wherein $R^1$, $R^2$ and $R^3$ are methyl or ethyl.

9. A compound according to claim 8, wherein $R^4$ is higher alkyl having up to 20 C atoms or benzyl.

10. A compound according to claim 2, wherein $R_F$ is a perfluorinated alkyl radical containing up to eight carbon atoms.

* * * * *

FO-1050
(5/69)

UNITED STATES PATENT OFFICE
CERTIFICATE OF CORRECTION

Patent No. 3,723,512      Dated March 27, 1973

Inventor(s) Hans Niederprum et al

It is certified that error appears in the above-identified patent and that said Letters Patent are hereby corrected as shown below:

Col. 3, line 44
     "$[C_4F_9SO_3]$" should be -- $[C_4F_9SO_3]^-$ --.

Col. 4, line 13
     omit the "9" at end of line.

Col. 5, line 39, cancel "C".

Col. 5, line 40
     "$F_8SO_{17}F_{2b1}$, m.p. 173°C." should be --$C_8F_{17}SO_2F$, m.p. 173°C.

Col. 5, line 60
     "$[C_8FSO]_3$" should be -- $[C_8F_{17}SO_3]^-$ --

Col. 6, line 12
     "3.3% N" should be -- 3.1% N --.

Col. 6, line 14
     "7.2S" should be -- 7.2%S --.

Col. 6, line 65
     "125°- °C." should be -- 125°-130°C. --.

Col. 7, line 15

"$]C_5H_{ax}NCH_3]^+$" should be -- $[C_5H_5NCH_3]^+$ --.

Col. 7, line 34
     "$N(CH_3)CHN(CH_{3e})]^+$" should be -- $N(CH_3)CHN(CH_3)]^+$ --.

- 1 -

FO-1050
(5/69)

UNITED STATES PATENT OFFICE
CERTIFICATE OF CORRECTION

Patent No. 3,723,512            Dated March 27, 1973

Inventor(s)    Hans Niederprum et al

It is certified that error appears in the above-identified patent and that said Letters Patent are hereby corrected as shown below:

Col. 8, line 2
     "$[_{c4}F$" should be -- $[C_4F$ --.

Col. 8, line 60
     "claim 2" should be -- claim 7 --.

Signed and sealed this 11th day of September 1973.

(SEAL)
Attest:

EDWARD M. FLETCHER, JR.          RENE D. TEGTMEYER
Attesting Officer                Acting Commissioner of Patents